United States Patent
Itazu et al.

(10) Patent No.: US 9,463,979 B2
(45) Date of Patent: Oct. 11, 2016

(54) DEVICE FOR MANUFACTURING RECYCLED CARBON FIBERS, AND METHOD FOR MANUFACTURING RECYCLED CARBON FIBERS

(75) Inventors: Hidehito Itazu, Gifu (JP); Hajime Kanki, Gifu (JP)

(73) Assignee: Carbon Fiber Recycle Industry Ltd., Gifu (JP)

( * ) Notice: Subject to any disclaimer, the term of this patent is extended or adjusted under 35 U.S.C. 154(b) by 498 days.

(21) Appl. No.: 14/127,164

(22) PCT Filed: Aug. 29, 2012

(86) PCT No.: PCT/JP2012/072532
§ 371 (c)(1),
(2), (4) Date: Dec. 17, 2013

(87) PCT Pub. No.: WO2013/032027
PCT Pub. Date: Mar. 7, 2013

(65) Prior Publication Data
US 2014/0120026 A1 May 1, 2014

(30) Foreign Application Priority Data

Aug. 30, 2011 (JP) .................................. 2011-186898

(51) Int. Cl.
*C01B 31/02* (2006.01)
*C08J 11/12* (2006.01)
(Continued)

(52) U.S. Cl.
CPC .............. *C01B 31/02* (2013.01); *B29B 17/02* (2013.01); *C08J 11/12* (2013.01); *C10B 47/06* (2013.01);
(Continued)

(58) Field of Classification Search
CPC ........ C08J 11/12; C01B 31/02; C10B 47/06; C10B 47/40; C10B 47/46; C10B 53/07; C10B 57/12; F27B 9/045; F27B 9/20; F27B 9/243; F27D 7/02; B29B 17/02; B29B 2017/0496; Y02P 20/143; B29K 2105/06; B29K 2307/04; Y02W 30/625
USPC .............................. 423/447.1–447.9; 422/187
See application file for complete search history.

(56) References Cited

U.S. PATENT DOCUMENTS 3,392,216 A * 7/1968 Otani ................. B65D 85/8043
264/29.2

FOREIGN PATENT DOCUMENTS

| JP | 07-033904 | 3/1995 |
| JP | 2008-285601 | 11/2008 |

(Continued)

*Primary Examiner* — Daniel C McCracken
(74) *Attorney, Agent, or Firm* — Wells St. John P.S.

(57) ABSTRACT

The purpose of the present invention is to provide a manufacturing device and a manufacturing method that use carbon fiber reinforced plastic (CFRP) as a source material for the efficient, low-cost manufacture of recycled carbon fibers exhibiting excellent ease of handling. A device for manufacturing recycled carbon fibers is provided with: a dry distillation-carbonization furnace (101) having a box-shaped main body (105), a dry distillation-carbonization chamber (102) which accommodates CFRP (40), a combustion chamber (103) equipped with a burner (104), and a heating chamber (115) formed in the space between the main body (105) and the dry distillation-carbonization chamber (102); and a continuous furnace (26) that continuously heats the CFRP (25) after dry distillation and removes a portion of the fixed carbon. The device for manufacturing recycled carbon fibers of the present invention is characterized in that the dry distillation-carbonization furnace (101) is provided with a steam generator (105) and steam at a temperature of 100° C. or higher and 700° C. or lower is supplied to the dry distillation-carbonization chamber (102).

5 Claims, 12 Drawing Sheets

(51) Int. Cl.
  *B29B 17/02* (2006.01)
  *C10B 47/06* (2006.01)
  *C10B 47/40* (2006.01)
  *C10B 47/46* (2006.01)
  *C10B 53/07* (2006.01)
  *C10B 57/12* (2006.01)
  *F27B 9/24* (2006.01)
  *F27B 9/04* (2006.01)
  *F27B 9/20* (2006.01)
  *F27D 7/02* (2006.01)
  *B29K 105/06* (2006.01)
  *B29K 307/04* (2006.01)
  *B29B 17/04* (2006.01)

(52) U.S. Cl.
  CPC ............... *C10B 47/40* (2013.01); *C10B 47/46* (2013.01); *C10B 53/07* (2013.01); *C10B 57/12* (2013.01); *F27B 9/045* (2013.01); *F27B 9/20* (2013.01); *F27B 9/243* (2013.01); *F27D 7/02* (2013.01); *B29B 2017/0496* (2013.01); *B29K 2105/06* (2013.01); *B29K 2307/04* (2013.01); *Y02P 20/143* (2015.11); *Y02W 30/622* (2015.05); *Y02W 30/625* (2015.05); *Y02W 30/703* (2015.05)

(56) References Cited

FOREIGN PATENT DOCUMENTS

| | | |
|---|---|---|
| JP | 2011-122032 A | 6/2011 |
| JP | 4949123 B | 3/2012 |
| JP | 4949123 B2 | 3/2012 |

* cited by examiner

Fig. 8
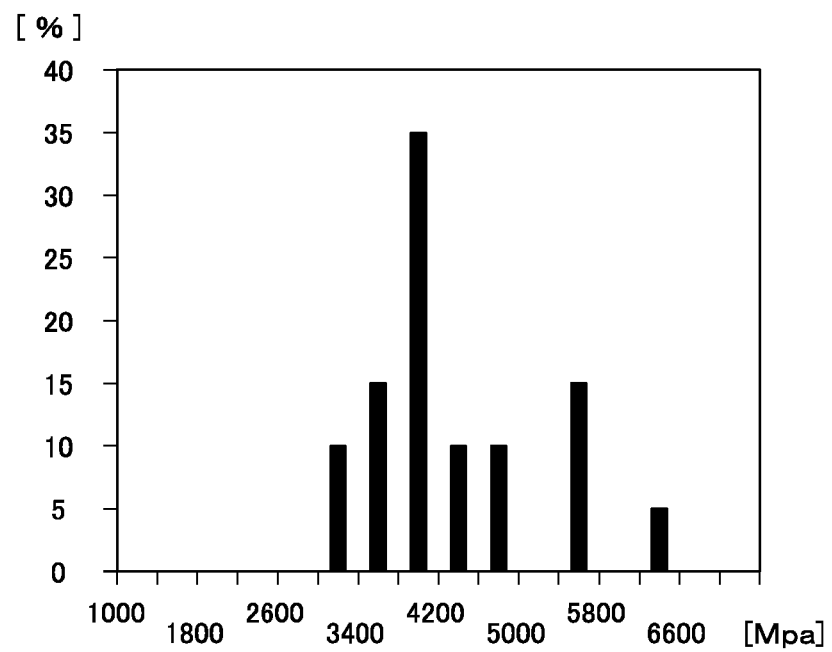
(a)
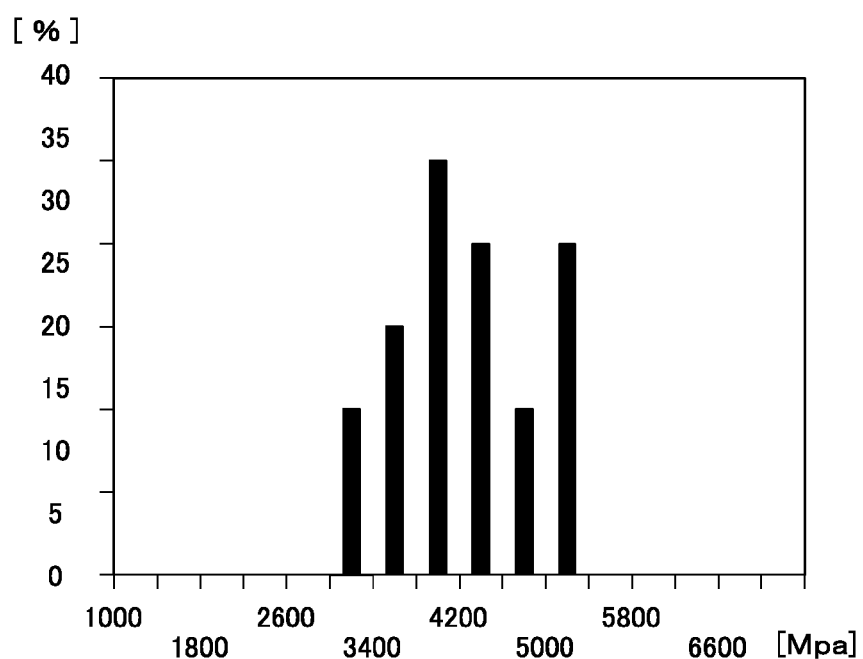
(b)

DEVICE FOR MANUFACTURING RECYCLED CARBON FIBERS, AND METHOD FOR MANUFACTURING RECYCLED CARBON FIBERS

FOREIGN PRIORITY CLAIM

This is a 35 U.S.C. §371 application of, and claims priority to, International Application No. PCT/JP2012/072532, which was filed on Aug. 29, 2012, and published as Publication No. WO 2013/032027 A1, which claims priority to Japan Patent Application No. 2011-186898, which was filed on Aug. 30, 2011, the entirety of all the applications are incorporated herein by reference.

TECHNICAL FIELD

The present invention relates to a device for manufacturing recycled carbon fibers and a method for manufacturing recycled carbon fibers. Specifically, the invention relates to a device for manufacturing recycled carbon fibers and a method for manufacturing recycled carbon fibers, which are characterized in heating carbon fiber reinforced plastic at a high temperature and removing a matrix component. Recycled carbon fibers produced by the device for manufacturing recycled carbon fibers and the method for manufacturing recycled carbon fibers according to the present invention are capable of being reused as a source material of unwoven fabrics, and the like.

BACKGROUND ART

Carbon fibers have been known as a material having excellent dynamic characteristics such as high intensity and high elasticity. Carbon fiber reinforced plastic (hereinafter also referred to as CFRP) that uses the carbon fibers as a filer component and an epoxy resin, a polyester resin, or the like as a matrix component has been manufactured. Carbon fiber has a light weight as ¼ of the specific weight of iron, has an intensity of 10 times as high as that of iron, and is a material excellent in abrasion resistance, heat resistance, electrical conductivity and tensile resistance, and thus, carbon fibers have been widely used in various industrial fields typically including the aerospace industry.

Carbon fiber reinforced plastic is mainly manufactured by generating a prepreg obtained by permeating a resin being a matrix component into carbon fibers and firing this prepreg in an autoclave with pressurization. In this manufacturing step of carbon fiber reinforced plastic, many mill ends are generated other than products. For example, when a large-sized product such as a body of an airplane is manufactured, a large amount of such mill ends described above are generated. Therefore, disposal of such mill ends has been a problem in some cases. As described above, carbon fiber reinforced plastic is a material in which different characterized filler components and matrix components exist in mixture and separation of these components and recycle or reuse of them were technically highly difficult. In addition, it was not effective from the viewpoints of cost and energy efficiency. As a result, in the present circumstances, a large portion of mill ends generated in manufacture and unused prepreg have been disposed by landfill, incineration, and the like. Furthermore, carbon fiber reinforced plastic recovered after completion of functions as a product has been similarly disposed by landfill, and the like in the same manner.

The inventors of the present invention have already developed a technology that relates to a regeneration device and a regeneration method of carbon fibers in which only a matrix component is heated and removed from carbon fiber reinforced plastic by thermal decomposition and carbon fibers are selectively recovered without lowering dynamic characteristics (see Patent Literature 1 and Patent Literature 2). According to the technology, an elongated tunnel-shaped regeneration space is constructed with a fire resistant material in a continuous furnace. In this continuous furnace, a mesh belt conveyor is arranged. Carbon fiber reinforced plastic is continuously supplied to the regeneration space in use of such a belt conveyor and, at the same time, carbon fiber reinforced plastic is heated in a heating zone in the regeneration space, thereby gasifying only a matrix component such as a thermoplastic epoxy resin by thermal decomposition, which makes it possible to recover carbon fibers (recycled carbon fibers) in a long fibrous state. As a result, a large amount of carbon fiber reinforced plastic can be effectively thermally decomposed and recycled carbon fibers can be thus generated.

In addition, Patent Literature 3 discloses a technology of recovering carbon fibers in a state of removing 68 to 80% of plastic by treating carbon fiber reinforced plastic with overheated steam at 800° C. or higher. Patent Literature 3 discloses a recovery device provided with a heater part that produces overheated steam, an introduction part that introduces the produced steam, and a holding part that maintains carbon fiber reinforced plastic.

PRIOR ART DOCUMENTS

Patent Literatures

Patent Literature 1: JP-A No. 2008-285601
Patent Literature 2: Japanese Patent No. 4949123
Patent Literature 3: JP-A No. 2011-122032

DISCLOSURE OF INVENTION

Problems to be Solved by the Invention

However, there have been problems mentioned below in the regeneration device and the regeneration method of carbon fibers described in Patent Literature 1 and Patent Literature 2. That is, mill ends, and the like, of recovered carbon fiber reinforced plastic have various shapes according to used moieties of products, and so on. Therefore, difference in heat transmission is caused in thermal decomposition due to gaps of shapes and variations in heating conditions have been generated in some cases. As a result, when recycled carbon fibers are generated from carbon fiber reinforced plastic using a regeneration device that has a conventional continuous furnace, differences in the above described thermal characteristics cause such defects that a part of carbon fiber reinforced plastic is in an overheated state and burned in the regeneration space, or heat does not sufficiently transmitted and a portion of a matrix component is remained, which results in generation of biases in properties and qualities of the obtained recycled carbon fibers in some cases.

On the other hand, in the method of recovering carbon fibers disclosed in Patent Literature 3, since 20 to 32% of a matrix component is remained, recovered carbon fibers maintain a shape of a fiber bundle, and on the other hand, there is a possibility of defect in flexibility. Therefore, when recovered carbon fibers are reused for an unwoven fabric, there is a high possibility of requiring a further process.

An object of the present invention is to provide a technology of manufacturing recycled carbon fibers effectively at a low cost by processing carbon fiber reinforced plastic in stable heating conditions in view of the above described actual condition. That is, a problem of the present invention is to provide recycled carbon fibers that are suitable for process of unwoven fabric, and the like, and a manufacturing device and a manufacturing method of the recycled carbon fibers.

Means for Solving the Problems

The device for manufacturing recycled carbon fibers of the present invention for the purpose of solving the above described problem is a device for manufacturing recycled carbon fibers, which uses carbon fiber reinforced plastic containing carbon fibers and a matrix component as a source material. The device for manufacturing recycled carbon fibers of the present invention has a dry distillation-carbonization furnace and a continuous furnace. The dry distillation-carbonization furnace is provided with a box-shaped main body, a dry distillation-carbonization chamber which is arranged in the inside of the main body and accommodates the carbon fiber reinforced plastic, a combustion chamber which is arranged in the lower part of the dry distillation-carbonization chamber and equipped with a burner, and a heating chamber formed in the space between the main body and the dry distillation-carbonization chamber. The dry distillation-carbonization furnace dry distils the carbon fiber reinforced plastic and converts a portion of the matrix component into fixed carbon to attach the fixed carbon to the surfaces of the carbon fibers. The continuous furnace is provided with a mesh transportation part which transports the carbon fibers attached with the fixed carbon and an elongated tunnel-shaped heat treatment space, and continuously heats the carbon fibers attached with the fixed carbon to remove a portion of the fixed carbon. The device for manufacturing recycled carbon fibers of the present invention is characterized in that a steam generator is provided to the dry distillation-carbonization furnaces and steam at 100° C. or higher and 700° C. or lower is supplied to the dry distillation-carbonization chamber.

The fixed carbon means a carbon content obtained by carbonization of a portion of a matrix component by heating and remaining in a form of powder, or the like. This fixed carbon is attached to surfaces of carbon fibers, thereby increasing a degree of tangle (aggregation) among respective recycled carbon fibers one another and easily forming a block such as a bundle. Therefore, a possibility of easily scattering by wind, and the like, is suppressed, and ease of handling thus becomes preferable. In addition, when a remained carbon ratio of the fixed carbon is high, the remained carbon functions as a kind of a binder that closely attaches recycled carbon fibers one another and a degree of a block may become larger in some cases.

Dry distillation means, for example, heating carbon fiber reinforced plastic in a state of no oxygen (so-called "braising") by charging carbon fiber reinforced plastic in a dry distillation-carbonization chamber in a batch-type dry distillation-carbonization furnace in which a heating temperature is set at 400° C. or higher to be sealed and supplying radiant heat from a combustion chamber where a burner is fired. Substances with low boiling points, moisture, and the like, which are contained in carbon fiber reinforced plastic, are gasified and carbonized by heating. Accordingly, a time for removing the fixed carbon by heating, which is successively carried out by a continuous furnace, can be shortened.

Furthermore, a carbonized content of carbon fiber reinforced plastic can be previously kept constant by the dry distillation step, the heating conditions are stabilized and preferable energy efficiency of an entire manufacturing device can be thus attained.

Convection in the dry distillation-carbonization chamber is promoted by supplying steam at 100° C. or higher and 700° C. or lower from a steam generator to the dry distillation-carbonization chamber, a gas (hereinafter, also referred to as a dry distillation gas) of a matrix component generated in the dry distillation-carbonization chamber by dry distillation can be effectively supplied to a burner. As a result, since a dry distillation gas can be stably burned, it can be possible to suppress a fuel cost. In addition, deposition of fixed oxygen obtained by converting a matrix component onto the floor and wall in the dry distillation-carbonization chamber and generation of tar in a gas combustion pipe by a dry distillation gas can be prevented from occurring. Herein, supply of steam heated to a temperature exceeding 700° C. is not preferable since load is given to the dry distillation-carbonization chamber and the pipe. Furthermore, supply of steam at such a high temperature as 800° C. or higher is not preferable since there is a possibility of causing decomposition or degradation of specific kinds of carbon fibers.

In the device for manufacturing recycled carbon fibers of the present invention, a steam generator preferably supplies overheated steam at 500° C. or higher and 700° C. or lower to the dry distillation-carbonization chamber. Overheated steam enables the inside of the dry distillation-carbonization chamber to be uniformly, directly heated. As a result, it becomes possible to more rapidly generate a dry distillation gas and effectively promote dry distillation.

In the device for manufacturing recycled carbon fibers of the present invention, two dry distillation-carbonization furnaces are provided, and the device can be provided with a branch pipe that supplies overheated steam to a dry distillation-carbonization chamber in the other dry distillation-carbonization furnace from a steam generator in one dry distillation-carbonization furnace, and a branch pipe that supplies overheated steam to a dry distillation-carbonization chamber in one dry distillation-carbonization furnace from a steam generator of the other dry distillation-carbonization furnace. Overheated steam generated from one of the dry distillation-carbonization furnaces is supplied as a heat source that heats a dry distillation-carbonization chamber in the other dry distillation-carbonization furnace, thereby reducing a cost of fuels to make it possible to produce recycled carbon fibers at a lower cost.

Furthermore, in the device for manufacturing recycled carbon fibers of the present invention, a combustion chamber in a dry distillation-carbonization furnace and a regeneration space in a continuous furnace are connected with a heat resistant route, and exhaust heat from the dry distillation-carbonization furnace can be supplied as a heat source of the continuous furnace. Exhaust heat from the dry distillation-carbonization furnace is used in the continuous furnace, thereby reducing a cost of fuels that is required for heating to make it possible to produce recycled carbon fibers at a lower cost.

The method for manufacturing recycled carbon fibers of the present invention is characterized by having a dry distillation step and a heat removal step. In the dry distillation step, while steam at 100° C. or higher and 700° C. or lower is supplied by a dry distillation-carbonization furnace, carbon fiber reinforced plastic is dry distilled and a portion of a matrix component is converted into fixed carbon to attach to surfaces of carbon fibers. In the heat removal step, transported carbon fibers are heated and a portion of the attached fixed carbon is removed in the regeneration space of the continuous furnace.

Herein, the continuous furnace means a furnace having an elongated tunnel-shaped regeneration space constructed in the inside thereof using a fire resistant material, for example, bricks, and the continuous furnace can heat carbon fibers attached with fixed carbon to the surface thereof in a heating zone of the regeneration space and thus enables manufacture of recycled carbon fibers. In this process, for transportation of carbon fibers attached with fixed carbon to the surfaces thereof to the regeneration space, a transportation part such as so-called "roller hearth kiln" in which plural rollers are arranged in parallel, a mesh transportation part that rotationally drives the mesh belt, and the like can be adopted.

Effect of the Invention

The device for manufacturing recycled carbon fibers of the present invention has a dry distillation carbonization furnace which can convert a portion of a matrix component of carbon fiber reinforced plastic into fixed carbon and allow the fixed carbon to attach to the surfaces of carbon fibers. This dry distillation carbonization furnace promotes convection in the dry distillation-carbonization chamber by supplying steam at 100° C. or higher and 700° C. or lower generated in a steam generator to the dry distillation-carbonization chamber, thereby making it possible to effectively expel a dry distillation gas generated by dry distillation in the dry distillation-carbonization chamber to a combustion device. As a result, the dry distillation gas can be stably burned, and in addition, deposition of fixed carbon obtained by converting a matrix component onto the floor and the wall in the dry distillation-carbonization chamber and generation of tar in a combustion pipe by the dry distillation gas can be prevented from occurring. That is, by supply of steam at 100° C. or higher and 700° C. or lower to the dry distillation-carbonization chamber, heating conditions can be stabilized and preferable energy efficiency of the entire manufacturing device can be attained.

The device for manufacturing recycled carbon fibers of the present invention can more uniformly, directly heats the inside of the dry distillation-carbonization chamber by supplying overheated steam at 500° C. or higher and 700° C. or lower to the dry distillation-carbonization chamber. Since the supplied overheated steam is at such a high temperature as 500° C. or more and 700° C. or lower, temperature decrease in the dry distillation-carbonization chamber is not caused and a dry distillation gas can be thus more rapidly generated. As a result, since the dry distillation gas can be quickly used as a fuel for the combustion chamber, dry distillation can be more effectively promoted.

The device for manufacturing recycled carbon fibers of the present invention, two dry distillation-carbonization furnaces are provided, and a branch pipe that supplies overheated steam to a dry distillation-carbonization chamber in the other dry distillation-carbonization furnace from a steam generator in one dry distillation-carbonization furnace can be provided and a branch pipe that supplies overheated steam to a dry distillation-carbonization chamber in one dry distillation-carbonization furnace from a steam generator in the other dry distillation-carbonization furnace can be provided. Overheated steam generated from one of the dry distillation-carbonization furnaces is supplied as a heat source that heats a dry distillation-carbonization chamber in the other dry distillation-carbonization furnace, thereby making it possible to reduce a cost of fuels. In addition, furthermore reduction of a fuel cost can be realized by supplying exhaust heat of a dry distillation-carbonization furnace to an overheating zone in a continuous furnace.

The method for manufacturing recycled carbon fibers of the present invention can produce recycled carbon fibers by introducing carbon fibers attached with a portion of a matrix component into a continuous furnace. Accordingly, a portion of a matrix component is remained as fixed carbon, thereby enabling preferable ease of handling of recycled carbon fibers.

BRIEF DESCRIPTION OF DRAWINGS

FIG. 8 is a view showing results of the intensity test of the recycled carbon fibers 8 according to the present invention.

MODE FOR CARRYING OUT THE INVENTION

Hereinbelow, preferable embodiments of the devices for manufacturing recycled carbon fibers 100 and 200 and the method for manufacturing recycled carbon fibers 1 (hereinafter simply referred to as the "manufacturing device 100", "manufacturing device 200" and "manufacturing method 1") according to the invention will be described with reference to drawings.

Preferable embodiments of the devices for manufacturing recycled carbon fibers 100 and 200 and the method for manufacturing recycled carbon fibers 1 of the present embodiments will be listed. Carbon fiber reinforced plastic 40 that is a source material of recycled carbon fibers 8 is obtained by recovering mill ends, and the like (including prepreg before firing), which is generated from a plant for manufacturing a product using carbon fiber reinforced plastic, and the carbon fiber reinforced plastic is mainly assumed to be a sheet-form. Since recovered mill ends, and the like contain paper and other foreign matters, materials obtained by carrying out preliminary removal operation such as removing these foreign matters with hands are used. Carbon fiber reinforced plastic 40 will be also referred to as CFRP 40 in the following.

Figure 1:
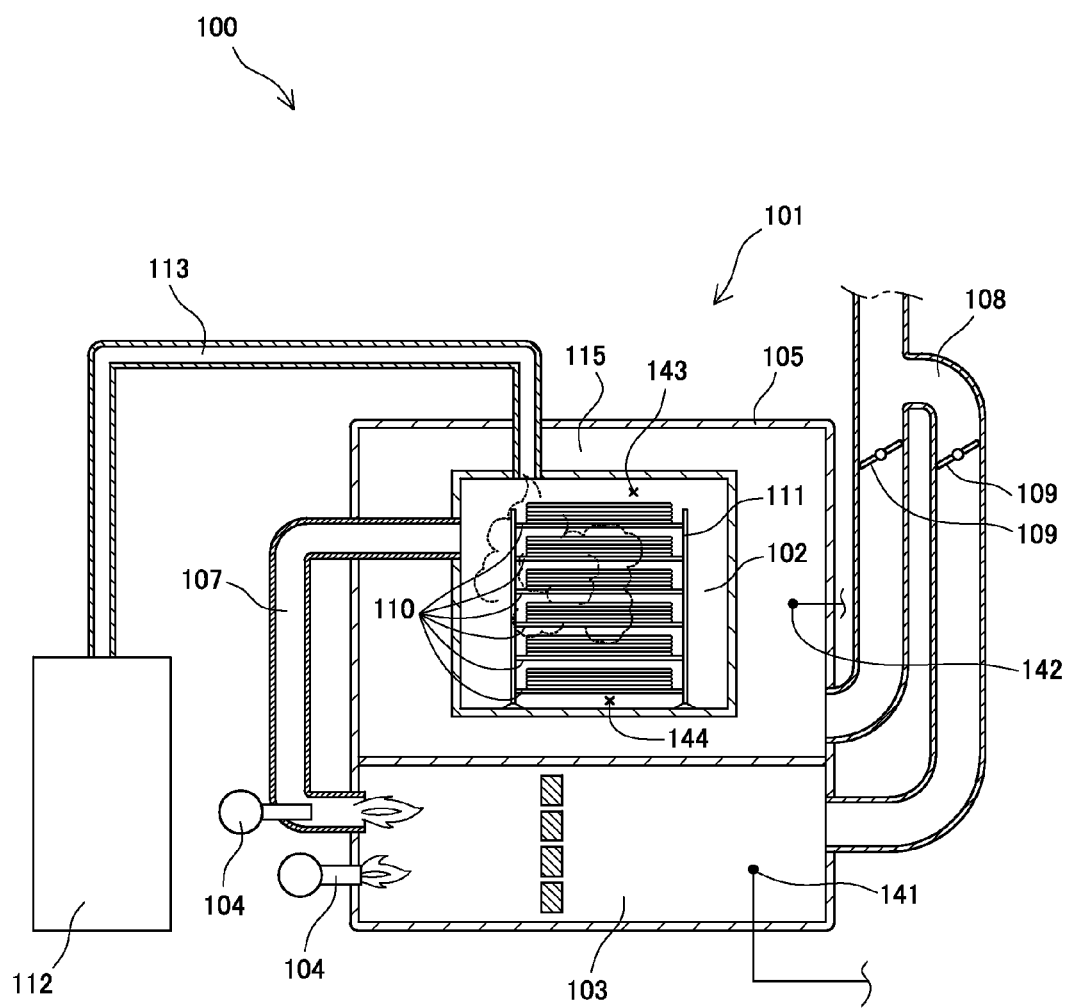
FIG. 1 is a front view showing a schematic construction of the dry distillation-carbonization furnace 101 that is apart of the device for manufacturing recycled carbon fibers of Example 1 of the present invention.
Figure 2:
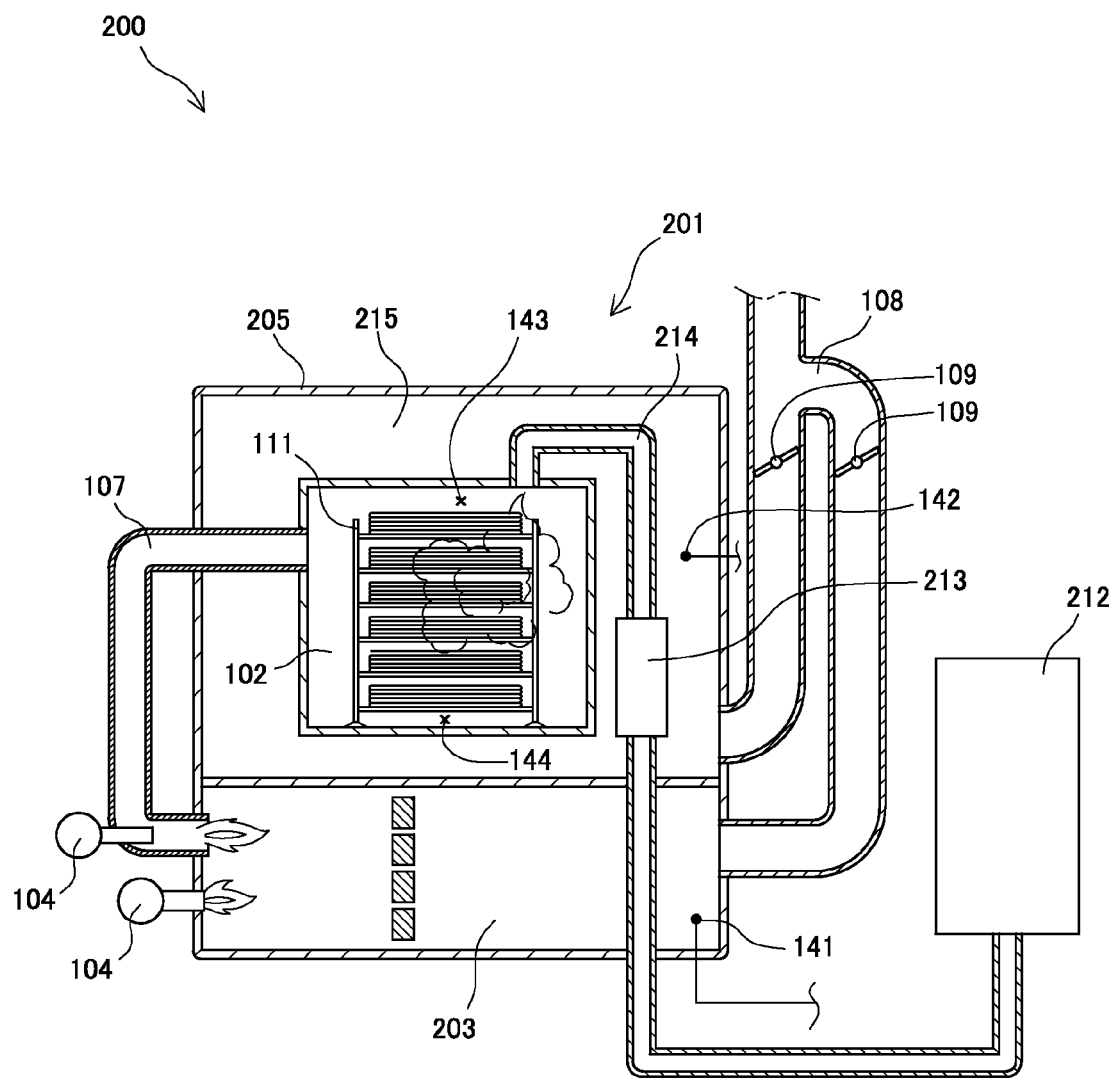
FIG. 2 is a front view showing a schematic construction of the dry distillation-carbonization furnace 201 that is apart of the device for manufacturing recycled carbon fibers of Example 2 of the present invention.

FIG. 1 shows a schematic construction of the dry distillation-carbonization furnace 101 that is a part of the device for manufacturing recycled carbon fibers 100. FIG. 2 shows a schematic construction of the dry distillation-carbonization furnace 201 that is a part of the device for manufacturing recycled carbon fibers 200. Constructions common to the dry distillation-carbonization furnaces 101 and 201 in the manufacturing devices 100 and 200 will be described. The dry distillation-carbonization furnaces 101 and 201 have box-shaped main bodies 105 and 205 having openings to which sealing doors not shown are attached in the front sides, the dry distillation-carbonization chambers 102 arranged in the inside of the main bodies, and combustion chambers 103 and 203 arranged in the lower parts of the dry distillation-carbonization chambers 102. Heating chambers 115 and 215 are formed in spaces between the main bodies 105 and 205 and the dry distillation-carbonization chambers 102. All external walls of the main bodies 105 and 205 and the dry distillation-carbonization chambers 102 are formed with heat resistant metal. The dry distillation-carbonization chambers 102 are provided with openings in a position of joining the openings of the main bodies 105 and 205, and the dry distillation-carbonization chambers 102 and the heating chambers 115 and 215 can be simultaneously sealed by closing sealing doors of the main bodies 105 and 205.

The devices 100 and 200 each is provided with a gas combustion pipe 107 which connects the inside of the dry distillation-carbonization chamber 102 and the burner 104. A dry distillation gas generated by dry distillation is supplied to the burner 104 passing through the gas combustion pipe 107 and burned. Combustion heat of the dry distillation gas is used for temperature increase and temperature maintenance in the dry distillation-carbonization chamber 102. In addition to the above, the devices 100 and 200 each has a hot air discharge duct 108 which respectively connects to a heating chamber 115 and a combustion chamber 103. The hot air discharge duct 108 is provided with a damper 109 in each path to the heating chamber 102 and the combustion chamber 103, and excessive heat is suitably discharged to the outside to thus adjust a temperature. Accordingly, the temperature in the dry distillation-carbonization chamber 102 is kept within the range from about 400° C. to about 650° C.

CFRP 40 is arrayed on heat resistant trays 110. The heat resistant trays 110 are piled up on a heat resistant shelf 111 in a state of having intervals one another and accommodated in the dry distillation-carbonization chamber 102. When a sealing door is closed, the dry distillation-carbonization chamber 102 is in a state of being sealed and carbonization dry distillation can be thus carried out without oxygen. A matrix component in CFRP 40 is partially decomposed into a gas such as hydrocarbon by dry distillation carbonization. During decomposition, a portion of the matrix component is carbonized to become a form of powder, or the like, and remained on surfaces of carbon fibers.

Figure 6:
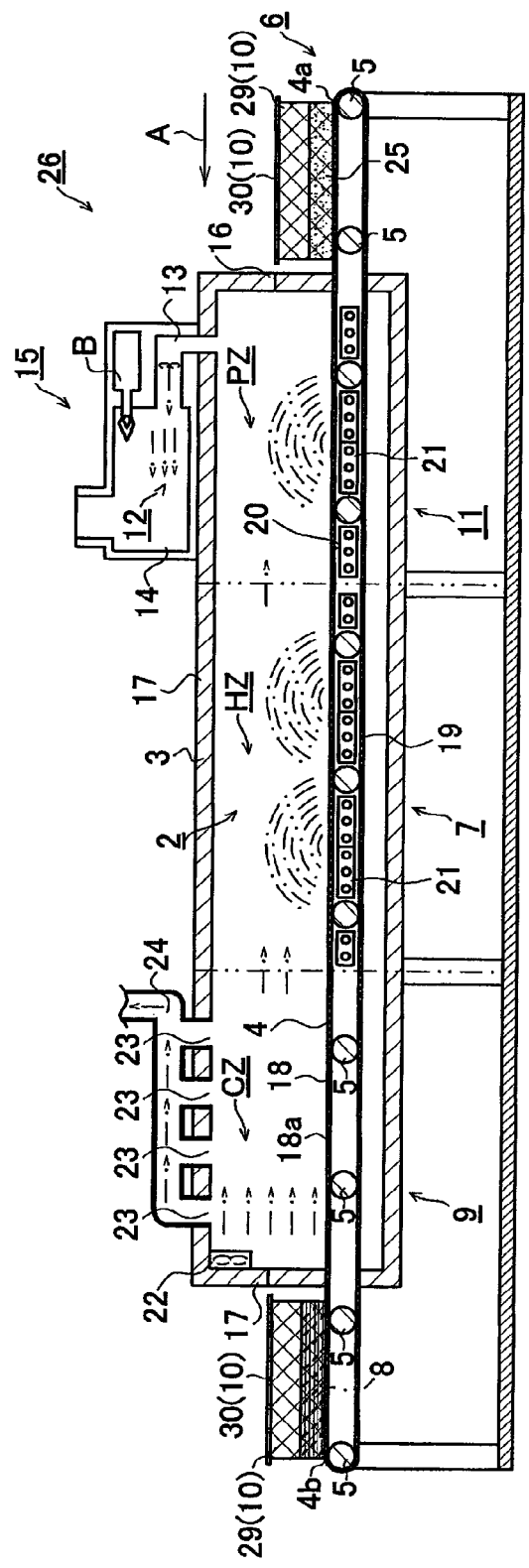
FIG. 6 is an explanation view showing a schematic construction of a continuous furnace 26 in the device for manufacturing recycled carbon fibers 100 according to the present invention.

Next, a continuous furnace 26 will be described with reference to FIG. 6. A continuous furnace main body 26 having an elongated tunnel-shaped regeneration space 2 constructed in the inside using a heat resistant brick that is a fire resistant material is provided with a mesh belt 4, a mesh transportation part 6, a heat removal part 7, and a cooling part 9. The mesh belt 4 is arranged as penetrating through the furnace main body 3. The mesh transportation part 6 supports the mesh belt 4 and also has plural rotational rollers 5 that can rotate around the axis. The heat removal part 7 is arranged in a central zone in the heating zone HZ out of three zones into which the regeneration space 2 is divided. The cooling part 9 is arranged in the cooling zone CZ in the transportation downstream side of the heating zone HZ, and produced recycled carbon fibers 8 are slowly cooled close to room temperature. Carbon fibers attached with fixed carbon, which are put on the mesh belt 4, are transported along the transportation direction (direction shown by the arrow A in FIG. 6), and introduced into the regeneration space 2 from an introduction inlet 16 opened to the continuous furnace 26 in the transportation upstream side and further discharged to the outside of the regeneration space 2 from a vent 17 opened to the transportation downstream side.

Herein, three zones are set in the regeneration space 2 between the introduction inlet 16 and the vent 17 as described above. More specifically described, the regeneration space 2 is divided into three zones: a preliminary heating zone PZ for gradually heating carbon fibers attached with fixed carbon along a temperature gradient that is previously set so as to reach a predetermined heating temperature (for example, 550° C.) from a temperature close to room temperature; the heating zone HZ for directly maintaining the reached heating temperature in the preliminary heating zone PZ, heating the carbon fibers attached with fixed carbon and thermally decomposing a portion of the fixed carbon to generate recycled carbon fibers 8, which is arranged in the transportation downstream side of the preliminary heating zone PZ; and the cooling zone CZ for cooling the recycled carbon fibers 8 after a regeneration treatment close to room temperature, which is arranged in the transportation downstream side of the heating zone HZ. Note that when a temperature gradient is not necessary in heating, the preliminary heating zone HZ (preliminary heating part 11) can be eliminated.

A mesh transportation part 6 having the mesh belt 4 constituted with a mesh member includes known constructions such as a rotational driving motor that generates turning force for rotating the rotational rollers 5 and a rotational transmission mechanism for transmitting the turning force to the rotational rollers 5, in addition to constructions such as the mesh belt 4 and plural rotational rollers 5 that are described above, and the details thereof are omitted herein. In addition, the heat removal part 7 and the preliminary heating part 11 are interposed between the upper belt 18 located in the upper side of the circular mesh belt 4 and the lower belt 19 located in the down side and each has a heat generator 21 arranged corresponding to the belt internal surface 20 of the upper belt 18. Accordingly, an electrical current is supplied to the heat generator 21 to generate registrant heat and heat can be thus added from the lower side to carbon fibers attached with the fixed carbon on the surfaces thereof, which are put on the belt surface 18a of the upper belt 18 and transported to the preliminary heating zone PZ and the heating zone HZ. Note that the mesh transportation part 6 has constructions such as an electrical current supplying part for providing an electrical current to the heat generator 21, an electrical current adjustment mechanism for adjusting a supplied electrical current value and controlling generated resistant heat, and temperature measurement sensors that measure a temperature at the position, oxygen sensors and carbon monoxide concentration sensors which are arranged in plural sites of each of the preliminary heating zone PZ and the heating zone HZ, but their drawings are omitted herein.

On the other hand, the cooling part 9 provided in the cooling zone CZ is to slowly cool recycled carbon fibers 8 in which a portion of the fixed carbon attached on the surfaces in the heating zone HZ is thermally decomposed and decrease a temperature to a level at which an operator can recover the recycled carbon fibers in the step of being discharged from the vent 17. In the case of the present embodiment, an air sending part 22 for forcibly sending cool air (external air) into the cooling zone CZ in the direction to the transportation upstream side from the vicinity of the vent 17 is provided. Furthermore, in the cooling zone CZ in the continuous furnace 3, plural continuous inlets 23 that are opened to the upper side so as to communicate with the regeneration space 2 are set and the continuous inlets 23 and an air intake duct 24 are connected. Accordingly, forcibly sent air is wormed up with heat exchange by being in contact with high-temperature recycled carbon fibers 8 in the cooling zone CZ, a portion of the air (for example, about 60%) is discharged through the continuous inlets 23 and the air intake duct 24 to the outside of the continuous furnace 3, and the remained air (for example, about 40%) flown to the heating zone HZ in the transportation upstream side.

Figure 7:
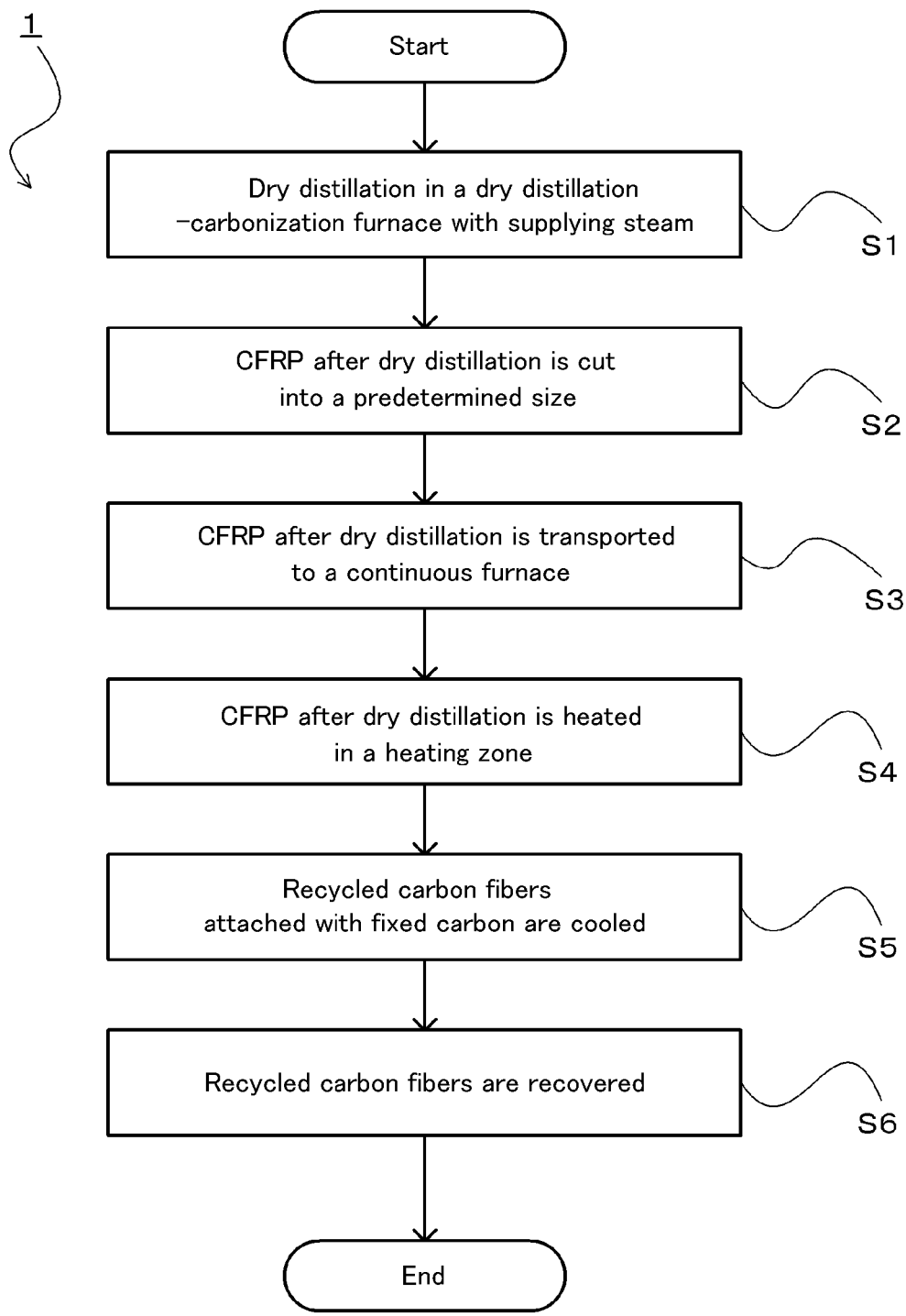
FIG. 7 is a flow chart showing one example of the method for manufacturing recycled carbon fibers 8 according to the present invention.

Next, a preferable embodiment of the manufacturing method 1 will be described with reference to the flow chart in FIG. 7. In the dry distillation step S1, CFRP 40 is put on a heat resistant shelf 111 of a dry distillation-carbonization chamber 102 in the dry distillation-carbonization furnaces 101 and 201 in the state of being accommodated on trays 110. By keeping a no oxygen state at a high temperature, a portion of substances with low boiling points and a matrix component, which are contained in CFRP 40, are dry distilled. One example of the dry distillation step of the present embodiment includes setting a carbonization temperature by the dry distillation-carbonization furnace 101 and 201 to 550° C. and continuing the temperature for 8 hours. The temperatures of the dry distillation-carbonization furnaces 101 and 201 are increased by firing the burner 104 supplied with fuels at the time of initiating the operation. When the dry distillation-carbonization chamber 102 becomes sufficiently a high temperature, a substance with a low boiling point in CFRP 40 vaporizes and carbonized hydrogen gases such as methane and benzene are further generated. These gases are introduced as dry distillation gases into the burner 104 and burned to contribute to maintenance of temperatures of the dry distillation-carbonization furnaces 101 and 201. On the other hand, a portion of a matrix component is converted into the fixed carbon and attached to the surfaces of carbon fibers. In the preferable embodiment, a residual carbon ratio of carbon fibers obtained in the dry distillation step S1 is adjusted to about 10% to about 12% with respect to the initial weight of the matrix component. Adjusting the residual carbon ratio makes it possible to stabilize heating conditions in heat removal of the fixed carbon, which is successively performed.

In the dry distillation step S1 in the manufacturing method 1, steam at 100° C. or higher and 700° C. or lower is generated in a steam generator and supplied to a dry distillation-carbonization chamber. By supply of steam, convection in the dry distillation-carbonization chamber can be promoted and, a dry distillation gas generated by dry distillation in the dry distillation-carbonization chamber can be effectively expelled to a combustion device. Effects in cases of adding steam at 100° C. and steam at 500° C. will be specifically described in examples.

Carbon fiber reinforced plastic after completion of the dry distillation step S1 has a form of carbon fibers 25 attached with fixed carbon on the surfaces. In the following, carbon fiber reinforced plastic after completion of the treatment by the dry distillation step is also referred to as CFRP 25 after dry distillation. Even though CFRP 25 after dry distillation has a smaller volume as compared to CFRP 25 before dry distillation due to generation of a carbonized hydrogen gas, and the like, in the dry distillation step, it still keeps a shape before dry distillation. On the other hand, due to attaching the fixed carbon to the surfaces of carbon fibers, respective carbon fibers are aggregated to become harder than the carbon fibers before dry distillation.

Next, in order to introduce CFRP 25 after dry distillation into the continuous furnace 26, a step of cutting CFRP 25 after dry distillation into a predetermined size is carried out (cutting step S2).

Then, cut CFRP 25 after dry distillation is put on the mesh belt 4 located adjacent to the introduction inlet 16 in a filling space 31. A mesh transportation part 6 is driven to thus transfer CFRP 25 after dry distillation put on the upper belt 18 of the mesh belt 4 in the horizontal direction (transportation step S3). A transfer speed of the mesh belt 4, that is, a transportation speed of CFRP 25 after dry distillation is set at, for example, 12.2 m/h (≈0.20 m/min). Note that in the continuous furnace 26 used in the present embodiment, a furnace internal distance from the introduction inlet 16 to the vent 17 in the furnace main body 3 is set to 26.5 m; on the other hand, the whole length from the upstream end 4a to the downstream end 4b is set to 35.0 m. Therefore, it takes 130 minutes to transport CFRP 25 after dry distillation in the regeneration space 2 from being introduced from the introduction inlet 16 to being discharged from the vent 17. During the transportation, when the transportation speed is set too slow, a retention time of CFRP 25 after dry distillation in the regeneration space 2 is prolonged and an operational efficiency is significantly reduced.

CFRP 25 after dry distillation reaching the heating zone HZ is heated in order to thermally remove a portion of fixed carbon attached to carbon fibers in the regeneration space 2 under an oxygen atmosphere (heat removal step S4). Herein, the heating temperature in the heating zone HZ is set at 550° C. in the present embodiment, but can be set at a high temperature such as about 600° C. During heating, carbon fibers of CFRP 25 after dry distillation are not gasified under an oxygen atmosphere unless a heating temperature is from 800° C. to 850° C. or higher. As a result, only a portion of the fixed carbon derived from a matrix component is thermally removed by an oxidation reaction to thus produce recycled carbon fibers 8. In heating, by adjusting a heating temperature in the heating zone HZ, a distance (length) in the heating zone HZ, and a transportation speed, CFRP 25 is set to reach the cooling zone CZ until a carbonized product of the matrix component is not completely removed.

As a result, the surfaces of the recycled carbon fibers 8 are attached with the carbonized product of the matrix component, that is, fixed carbon.

Then, since the recycled carbon fibers 8 reaching the cooling zone CZ do not receive heat from the heat generator 21 in the heat removal part 7, the recycled carbon fibers 8 gradually release heat and are slowly cooled while they are transported along the mesh belt 4 (cooling step S5). In this step, an external air is sent by an air sending part 22 from the transportation downstream side, so that the recycled carbon fibers 8 being in contact with the external air have a further radical gradient of temperature decrease, and even when the cooling zone CZ is set short, a sufficient cooling effect can be obtained. Note that since fixed carbon is attached to the recycled carbon fibers 8, the recycled carbon fibers 8 do not easily fly away by an external air by the air sending part 22 as compared to recycled carbon fibers from which a matrix component is completely removed. An external air sent to the cooling zone CZ is in contact with the recycled carbon fibers 8 that still have a high temperature and warmed up with heat exchange. As a result, a portion of the external air is absorbed from the air intake duct 24 and discharged to the outside of the continuous furnace 26. On the other hand, a portion of the residual reaches the heating zone HZ. In this process, an external air contains oxygen and consumed for an oxidation reaction in order to gasify a carbonized product derived from a matrix component.

After that, the recycled carbon fibers 8 reach the end of the regeneration space 2 and the sufficiently cooled recycled carbon fibers 8 are discharged from the vent 17 (step S6).

As explained above, according to the manufacturing method 1 of the present embodiment, CFRP 40 being a source material is dry distilled in the dry distillation-carbonization furnaces 101 and 201, CFRP 25 after dry distillation is put on the mesh belt in the transportation upstream side and transported at a predetermined transportation speed, a carbonized product of a matrix component is thermally decomposed in the regeneration space 2 while remaining a portion of the carbonized product; therefore, only the matrix component can be selectively removed from CFRP 25 after dry distillation and recycled carbon fibers 8 that do not easily fly away by wind, and the like, can be regenerated.

In the device for manufacturing recycled carbon fibers and the method for manufacturing recycled carbon fibers of the present embodiment, CFRP 40 to be treated is supposed to be CFRP obtained by using, for example, polyacrylonitrile-based carbon fibers (PAN-based carbon fibers) as a filler component and an epoxy resin, or the like as a matrix component, and is not limited thereto. In this case, a weight ratio of a matrix component occupied in CFRP 40 is generally about 60% by weight. Herein, an epoxy resin, or the like, being a matrix component is thermally decomposed at a lower heating temperature (for example, around 400° C. to 600° C.) as compared to a heating decomposition temperature (for example, around 850° C.) of a carbon fiber being a filler component, and has a gasifying property. In the same manner, the fixed carbon derived from a matrix component is also gasified approximately at the same temperature.

Note that a resin used as a matrix component is not limited to the above described epoxy resin, and examples thereof include a polypropylene resin, a polyethylene resin, a polymethyl methacrylate resin, a saturated polyester resin, and a polycarbonate resin as thermoplastic resins. In addition, examples include an unsaturated polyester resin, a phenol resin, and a vinyl ester resin as thermosetting resins, other than epoxy resins.

CFRP 40 containing a thermosetting resin as a matrix component has a possibility of intensively adhering to carbon fibers to be regenerated by a thermosetting reaction of a resin when it is directly heated. Therefore, such CFRP 40 is gradually heated to gently increase a temperature, thereby making it possible to cause gasification or a combustion reaction, and the manufacturing method and the manufacturing device of the present embodiment can be thus applied.

A matrix component vaporized in a dry distillation-carbonization chamber of a dry distillation-carbonization furnace is supplied to a burner 104 as a dry distillation gas and burned. Since many kinds of resins have large heat generation amount in burning, a dry distillation gas is in a state of autogeneous combustion in the dry distillation-carbonization furnace 201 from the time immediately after the temperature in the furnace reaches 500° C. to the completion of the dry distillation step and other fuels such as kerosene for keeping the temperature in the furnace is not necessary. As a result, significant decrease of energy in use can be achieved.

Example 1

In the present example, recycled carbon fibers 8 produced in a manufacturing method in which steam at 100° C. is supplied to a dry distillation-carbonization chamber in a dry distillation-carbonization furnace in the dry distillation step (step S1) and about 3% of the fixed carbon is remained in the heat removal step S4 will be specifically described. FIG. 1 shows a construction of the dry distillation-carbonization furnace 101 in the manufacturing device 100 according to the example. The construction of the continuous furnace 26 and production steps from the step S2 to the step S6 which relate to the continuous furnace 26 areas described in the embodiments and, therefore, repeated explanations are omitted.

The dry distillation-carbonization furnace 101 is provided with a box-shaped main body 105, a dry distillation-carbonization chamber 102 (carbonization box 102) arranged in the inside of the main body 105, and a combustion chamber 103 arranged in the lower part of the dry distillation-carbonization chamber 102. A heating chamber 115 is formed in the space between the main body 105 and the dry distillation-carbonization chamber 102. In the present example, a temperature measurement sensor 141 is arranged in the combustion chamber. A temperature measurement sensor 142 is also arranged in the side wall of the heating chamber 115. Furthermore, a temperature measurement sensor 143 is arranged in the upper part of the dry distillation-carbonization chamber 102 and a temperature measurement sensor 144 is arranged in the lower part of the dry distillation-carbonization chamber 102.

The dry distillation-carbonization furnace 101 also has an external boiler 112 and a steam pipe 113 communicating the external boiler 112 with the dry distillation-carbonization chamber 102. When the dry distillation step S1 is initiated and at the time point when the temperature in the dry distillation-carbonization chamber 102 exceeds 100° C., steam at 100° C. is supplied from the external boiler 112 through the steam pipe 113. Supply of steam is continued until dry distillation is completed and cooling is initiated.

Figure 4:
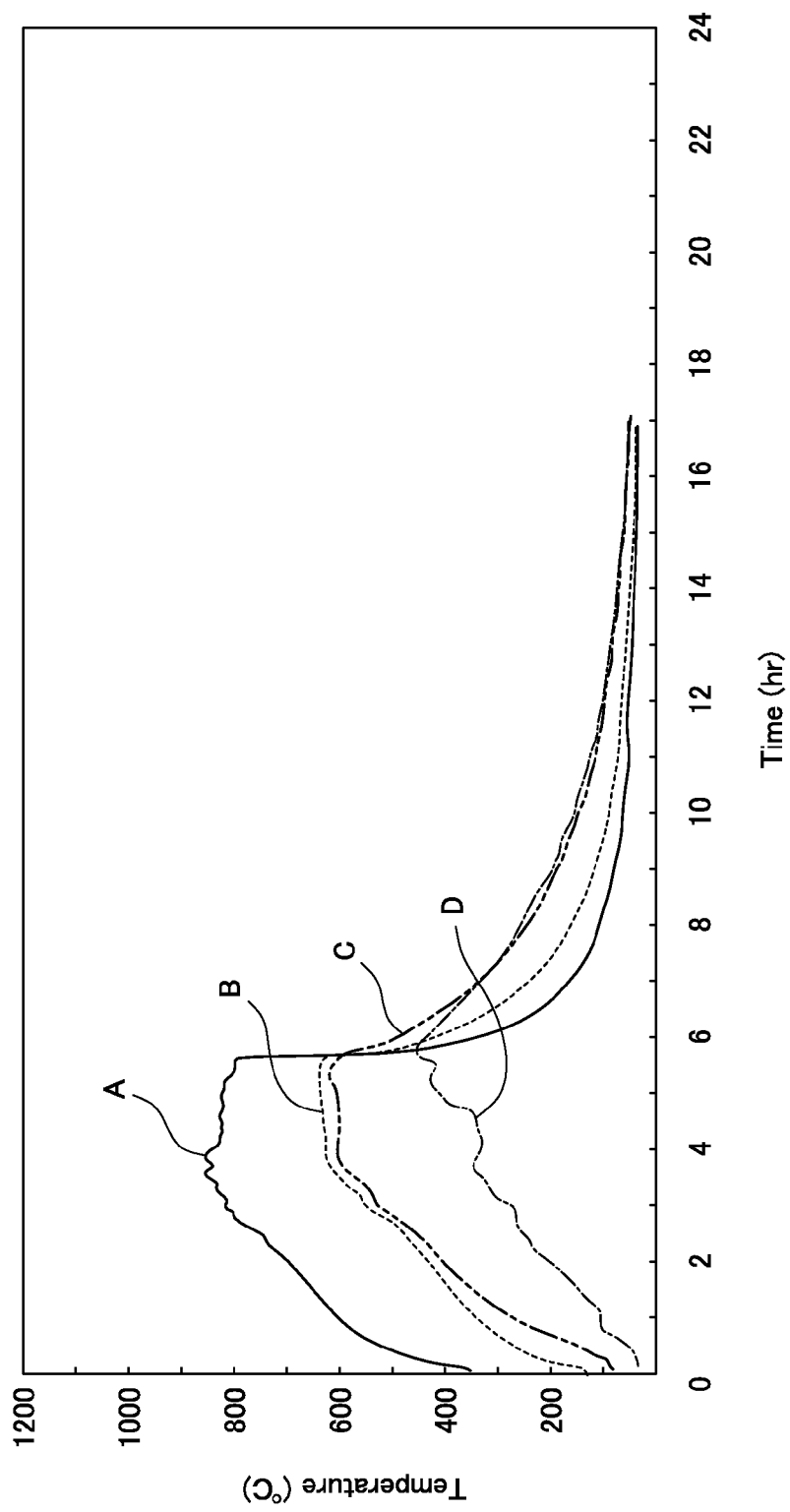
FIG. 4 is a view showing variation with time of temperatures in the furnace when steam at 100° C. is supplied to the dry distillation-carbonization furnace 101 according to the present invention.

FIG. 4 shows temperature change in the inside of the dry distillation-carbonization furnace 101 during the dry distillation step of supplying steam at 100° C. Herein, temperature change in the temperature measurement sensor 141 in the combustion chamber is expressed by a solid line of the symbol A, temperature change in the temperature measurement sensor 142 in the heating chamber is expressed by a dashed line of the symbol B, temperature change in the temperature measurement sensor 143 in the upper part of the dry distillation-carbonization chamber is expressed by a two-dot chained line of the symbol C, and temperature change in the temperature measurement sensor 144 in the lower part of the dry distillation-carbonization chamber is expressed by a one-dot chained line of the symbol D. As shown in FIG. 4, by setting a target temperature at 800° C. in the combustion chamber, the temperature of the dry distillation-carbonization chamber reached 550° C. after about 3 hours and reached about 630° C. at highest. The temperature in the dry distillation-carbonization chamber was 607° C. at highest during the dry distillation step S1. Further, the temperature of the lower part of the heat resistant shelf in the dry distillation-carbonization chamber was 420° C. at highest. Completion of the dry distillation step was determined based on a flow rate of a dry distillation gas flown from the gas combustion pipe 107 in the present example, and a time required for dry distillation was 6 hours 30 minutes.

Figure 3:
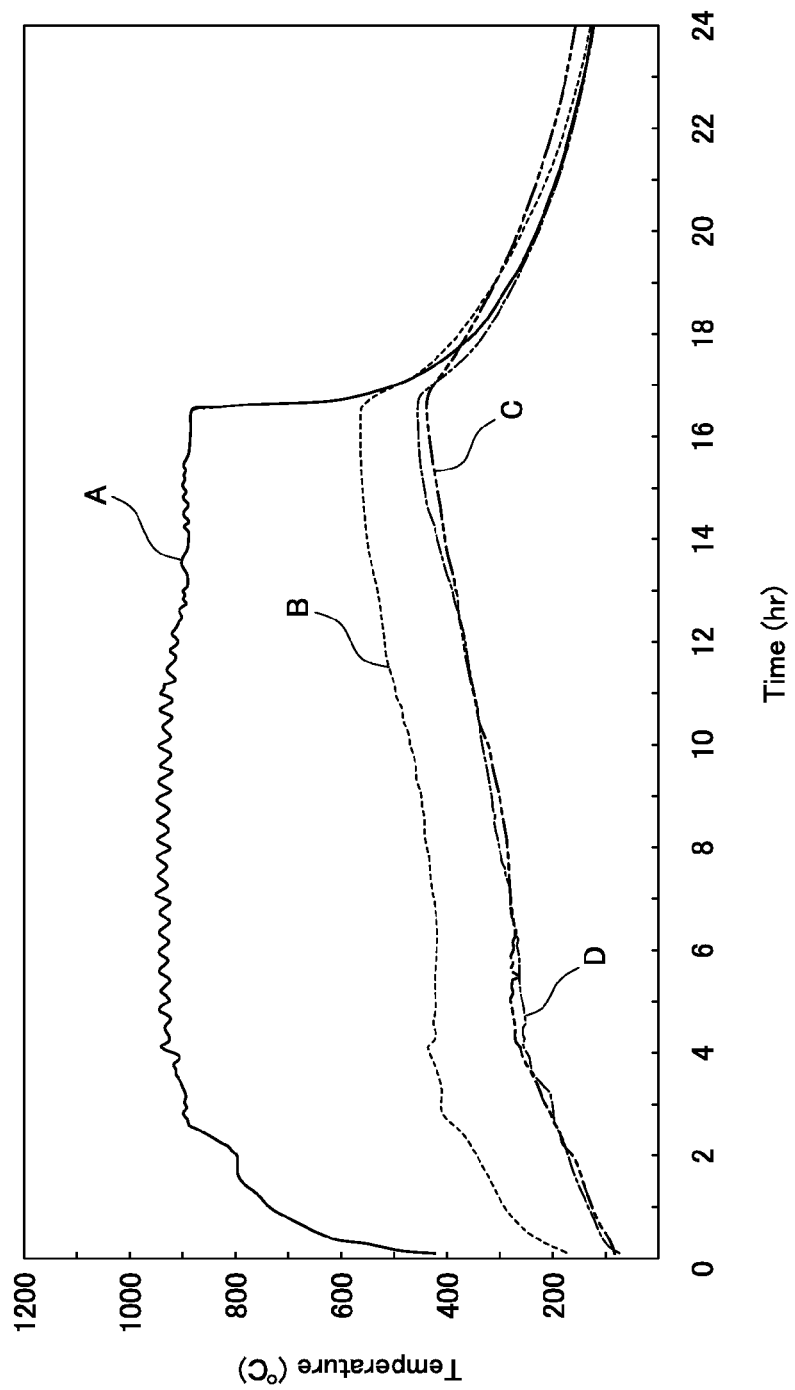
FIG. 3 is a view showing variation with time of temperatures in the furnace when steam at 100° C. is supplied to the large-size dry distillation-carbonization furnace 101 according to the present invention.

FIG. 3 shows a relationship between temperature distribution of a dry distillation-carbonization furnace and a time when steam at 100° C. was supplied by a steam generator to produce recycled carbon fibers 8, using a dry distillation-carbonization furnace with a larger volume, which has two dry distillation-carbonization chambers. Herein, a temperature in the combustion chamber is expressed by a solid line of the symbol A, and temperature change in the heating chamber is expressed by a dashed line of the symbol B. Temperature changes of upper parts of respective two dry distillation-carbonization chambers were measured in a larger dry distillation-carbonization furnace and expressed by two-dot chained line of the symbol C and a one-dot chained line of the symbol D. As shown in FIG. 3, a target temperature in the combustion chamber was set at 900° C., but a temperature in the dry distillation-carbonization chamber did not reach 500° C. and kept at about 400° C. to 450° C. A temperature in the upper part of the dry distillation-carbonization chamber was 380° C. at highest during the dry distillation step S1. However, the dry distillation step could effectively proceed by supplying steam at 100° C. even in a large dry distillation-carbonization furnace.

Tensile strength of the recycled carbon fibers 8 in the present example was testified. A tensile test was carried out in the method of a simple tensile test in accordance with JIS R7606. The result was shown in FIG. 8. FIG. 8(a) is a test result of virgin carbon fibers as a comparative example, and FIG. 8(b) is a test result of recycled carbon fibers 8 produced in the present example. The recycled carbon fibers 8 produced in the present example had rather small variation in a strength as compared to the virgin unused carbon fibers, and had a strength of 80% on average with respect to the virgin carbon fibers, and it was revealed that the recycled carbon fibers 8 can be reused.

Example 2

The device 200 for manufacturing recycled carbon fibers 8 and the method for manufacturing recycled carbon fibers 8 in the present example are characterized in that steam at 500° C. (overheated steam) is supplied to a dry distillation-carbonization chamber in a dry distillation step S1. FIG. 2 shows a construction of the dry distillation-carbonization furnace 201 in the manufacturing device 200 according to the example. The same symbols are given to devices and steps having the same constructions as in Example 1 and repeated explanations are omitted.

The dry distillation-carbonization furnace 201 is provided with a box-shaped main body 205, a dry distillation-carbonization chamber 102 arranged in the inside of the main body 205, and a combustion chamber 203 arranged in the lower part of the dry distillation-carbonization chamber 102. A heating chamber 215 is formed in the space between the main body 205 and the dry distillation-carbonization chamber 102. The dry distillation-carbonization furnace 201 also has an external boiler 212, an overheated steam generator 213 arranged in the heating chamber 215, and a steam pipe 214 that is installed from the external boiler 212 through the overheated steam generator 213 reaching the inside of the dry distillation-carbonization chamber 102. The overheated steam generator 213 in the present example is a heat exchanger. When the dry distillation step S1 is initiated, steam preheated in the external boiler 212 is supplied to the overheated steam generator 213 and further overheated in the heating chamber 215. At the time point when the temperature in the heating chamber 215 exceeds 500° C., overheated steam at 500° C. is supplied to the dry distillation-carbonization chamber 102 from the overheated steam generator 213 through the steam pipe 214. Supply of overheated steam is continued until dry distillation is completed and cooling is initiated.

Figure 5:
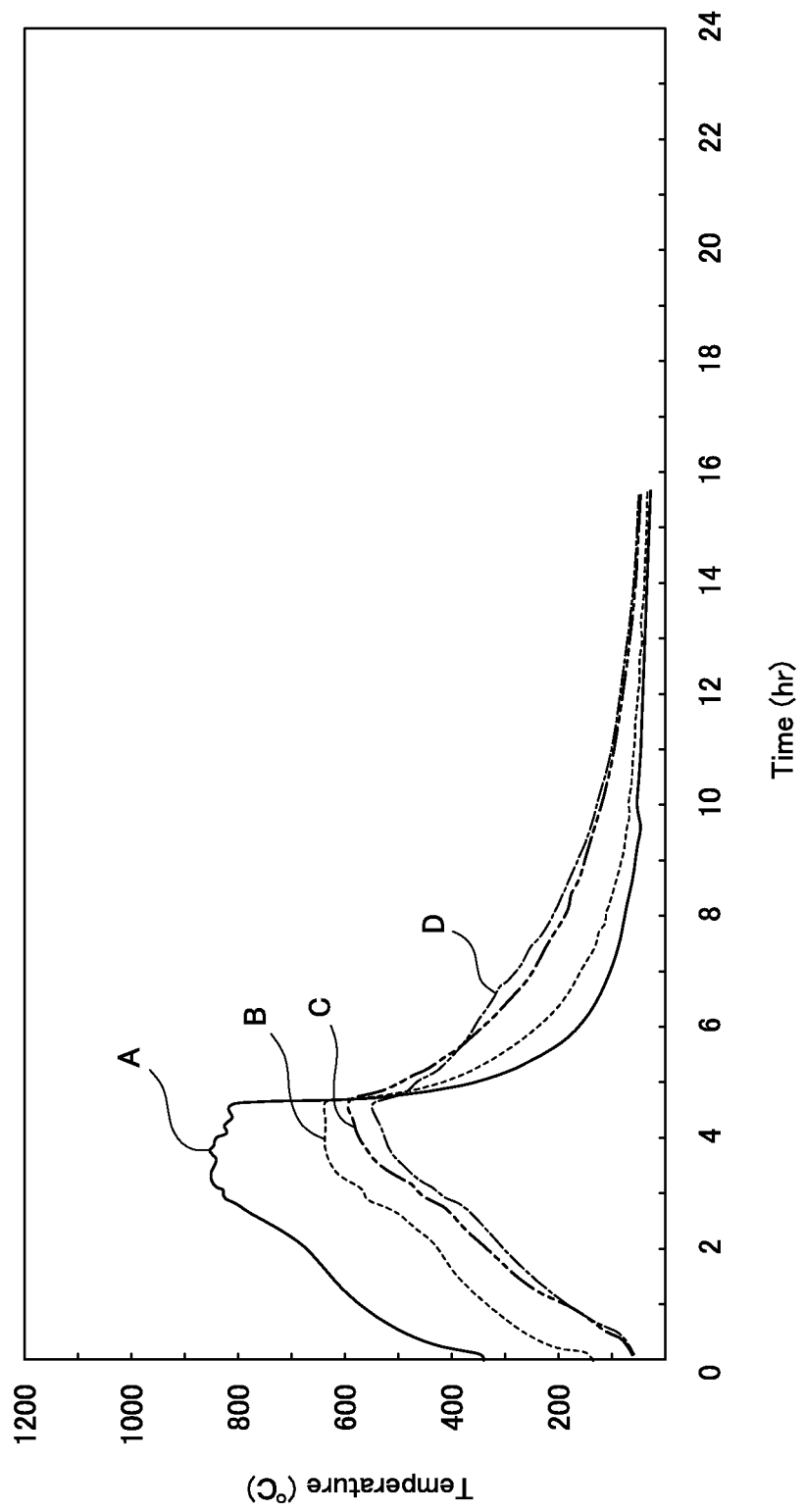
FIG. 5 is a view showing variation with time of temperatures in the furnace when steam at 500° C. is supplied to the dry distillation-carbonization furnace 201 according to the present invention.

FIG. 5 shows temperature change in the inside of the dry distillation-carbonization furnace 201 during the dry distillation step of supplying overheated steam at 500° C. Herein, temperature change in the temperature measurement sensor 141 in the combustion chamber 203 is expressed by a solid line of the symbol A, temperature change in the temperature measurement sensor 142 in the heating chamber 215 is expressed by a dashed line of the symbol B, temperature change in the temperature measurement sensor 142 in the upper part of the dry distillation-carbonization chamber 102 is expressed by a two-dot chained line of the symbol C, and temperature change in the temperature measurement sensor 143 in the lower part of the dry distillation-carbonization chamber 102 is expressed by a one-dot chained line of the symbol D. As shown in FIG. 5, by setting a target temperature in the combustion chamber 203 at 800° C., the temperature of the dry distillation-carbonization chamber 102 reached 500° C. after about 2.5 hours and reached 630° C. at highest. The temperature of the upper part of the heat resistant shelf in the dry distillation-carbonization chamber 102 was 566° C. at highest during the dry distillation step S1. Further, the temperature of the lower part of the heat resistant shelf in the dry distillation-carbonization chamber 102 was 563° C. at highest. The fact means that the temperature in the dry distillation-carbonization chamber 102 is increased more promptly and uniformly than that in Example 1. As a result, a time required for the dry distillation step S1 was about 3 hours 40 minutes. The time required for the dry distillation step in Example 1 using steam at 100° C. was 6 hours 30 minutes, and thus, an effect of speeding up the step due to use of overheated steam is apparent.

A major reason of obtaining such an effect of speeding up the step is because the temperature in the dry distillation-carbonization chamber 102 is promptly and uniformly increased due to supply of overheated steam and a dry distillation gas is generated during a short time from initiation of dry distillation. A dry distillation gas is supplied to a burner 104 through a gas combustion pipe 107 to be used as a fuel. The dry distillation-carbonization furnace 201 was in a state of autogeneous combustion from the time immediately after the temperature in the furnace reached 500° C. to the completion of the dry distillation step and fuels other than the dry distillation gas were not necessary in the present example, which thus enabled decrease of a time required for the step.

Example 3

Figure 9:
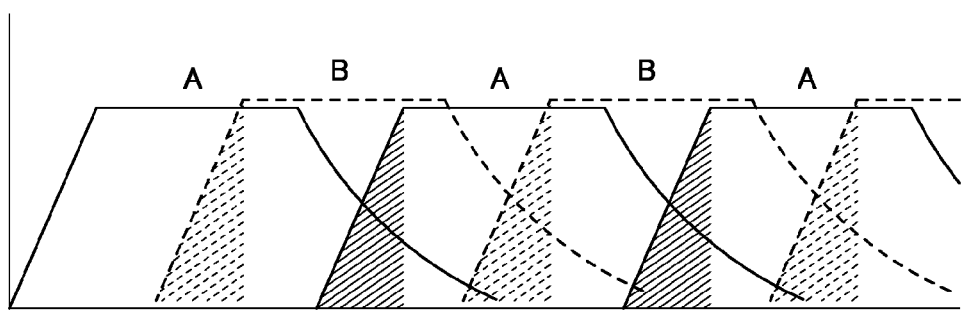
FIG. 9 is a view schematically showing temperature distribution of a dry distillation-carbonization chamber when two dry distillation-carbonization furnaces were alternately driven.
Figure 10:
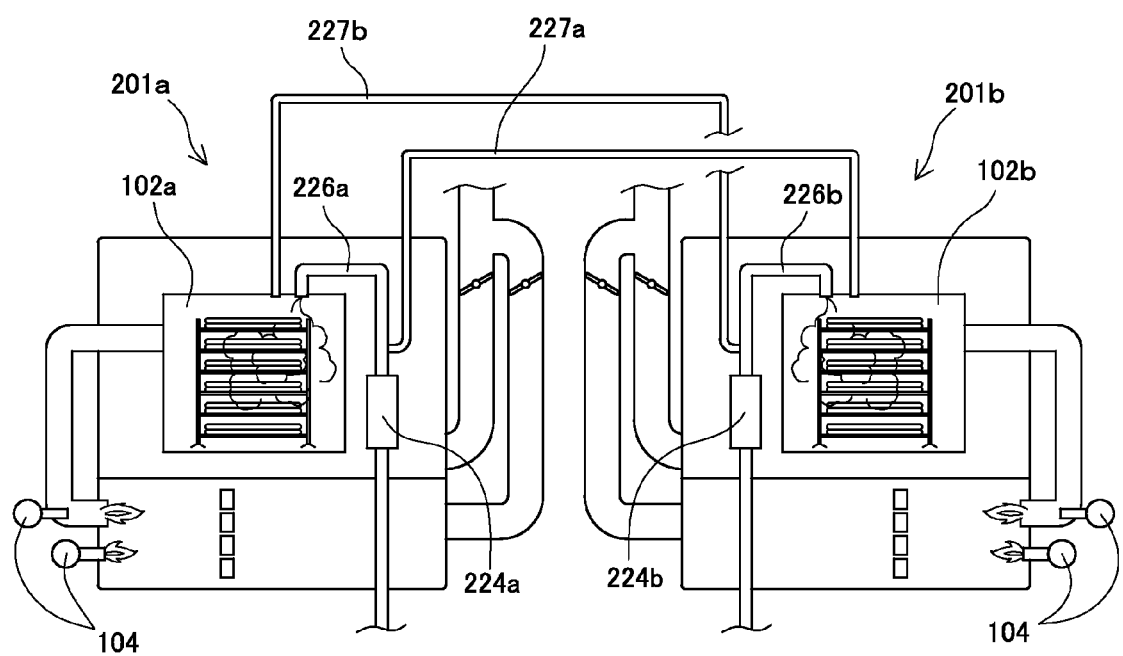
FIG. 10 is a schematic construction diagram showing a state of connecting two dry distillation-carbonization furnaces of Example 3 of the present invention with a branch pipe.

Two dry distillation-carbonization furnaces 201a and 201b are used in the present example, as shown in FIG. 10. The same symbols are given to devices having the same constructions as in Example 2 and repeated explanations are omitted. A steam generator in the dry distillation-carbonization furnace 201a is provided with a steam pipe 226a reaching a dry distillation-carbonization chamber 102a through an overheated steam generator 224a. The steam pipe 226a has a branch pipe 227a that is diverged in front of the dry distillation-carbonization chamber 102a. The branch pipe 227a is installed to the dry distillation-carbonization chamber 102b in the other dry distillation-carbonization furnace 201b, and the end part is opened into the inside of the dry distillation-carbonization chamber 102b. A steam generator in the other dry distillation-carbonization furnace 201b is provided with a steam pipe 226b reaching the dry distillation-carbonization chamber 102b through an overheated steam generator 224b. The steam pipe 226b has a branch pipe 227b that is diverged in front of the dry distillation-carbonization chamber 102b. The branch pipe 227b is installed to the dry distillation-carbonization chamber 102a in one dry distillation-carbonization furnace 201a, and the end part is opened into the inside of the dry distillation-carbonization chamber 102a. Other constructions of the dry distillation-carbonization furnaces 201a and 201b are the same as the dry distillation-carbonization furnace 201 in Example 2. Timings of initiation of the dry distillation step S1 in the dry distillation-carbonization furnaces 201a and 201b of the present example are temporally staggered. Then, when dry distillation of one dry distillation-carbonization furnace was completed and initiated in a cooling stage, overheated steam that was sufficiently heated to a high temperature by the overheated steam generator was supplied to a dry distillation-carbonization chamber in the other dry distillation-carbonization furnace, and supplied as a heat source at the time of initiation of the dry distillation step S1. FIG. 9 schematically shows a relationship between temperature distribution and time of the dry distillation-carbonization chambers 102a and 102b when two dry distillation-carbonization furnaces 201a and 201b were alternately driven. In the figure, the temperature distribution expressed by the symbol A is a temperature distribution of the dry distillation-carbonization chamber 102a, and the temperature distribution expressed by the symbol B is a temperature distribution of the dry distillation-carbonization chamber 102b. Overheated steam of one dry distillation-carbonization furnace is used as a heat source of a dry distillation-carbonization chamber at the time of initiation of the other dry distillation step, thereby reducing fuels used in the burner 104, which makes it possible to produce recycled carbon fibers 8 at a lower cost.

Example 4

Figure 11:
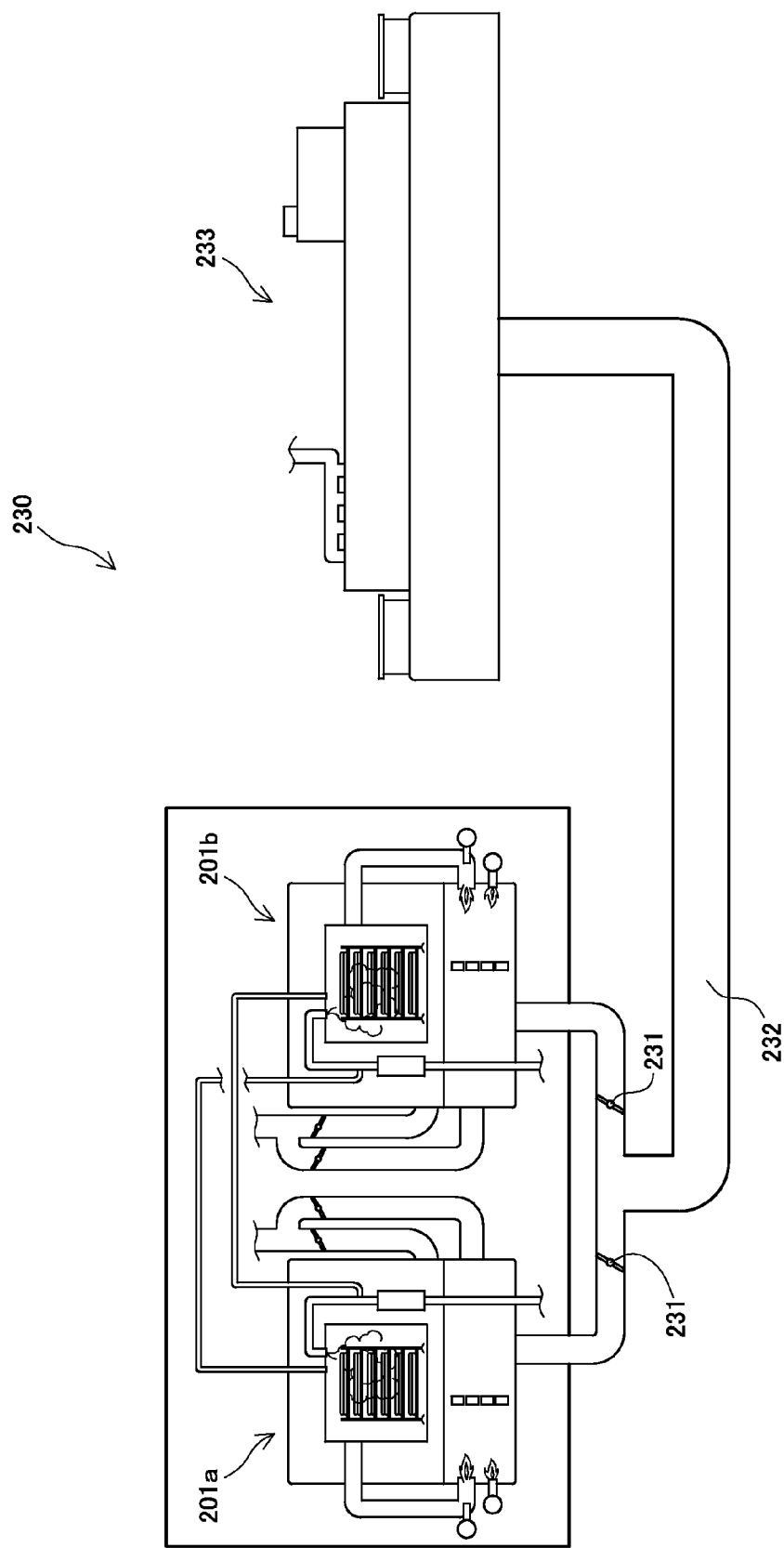
FIG. 11 is a schematic construction diagram showing a state of connecting combustion chambers of two dry distillation-carbonization furnaces of Example 4 of the present invention to a continuous furnace with a heat resistant route.

FIG. 11 schematically shows a construction of the manufacturing device 230 of the present example. The device 230 for manufacturing recycled carbon fibers of the present example is provided with a construction in which two dry distillation-carbonization furnaces 201a and 201b and the heating zone HZ in the continuous furnace 233 are communicated through a heat resistant route 232 having a damper 231, in addition to a construction in which two dry distillation-carbonization furnaces 201a and 201b can supply overheated steam to each other's dry distillation-carbonization chambers. Exhaust heat of the dry distillation furnaces 201a and 201b is supplied to the heating zone HZ in the continuous furnace 233 to heat the heating zone HZ, thereby reducing an electrical current supplied to the heat generator 21, which makes it possible to save more fuel cost and produce recycled carbon fibers 8 at a lower cost.

Example 5

Figure 12:
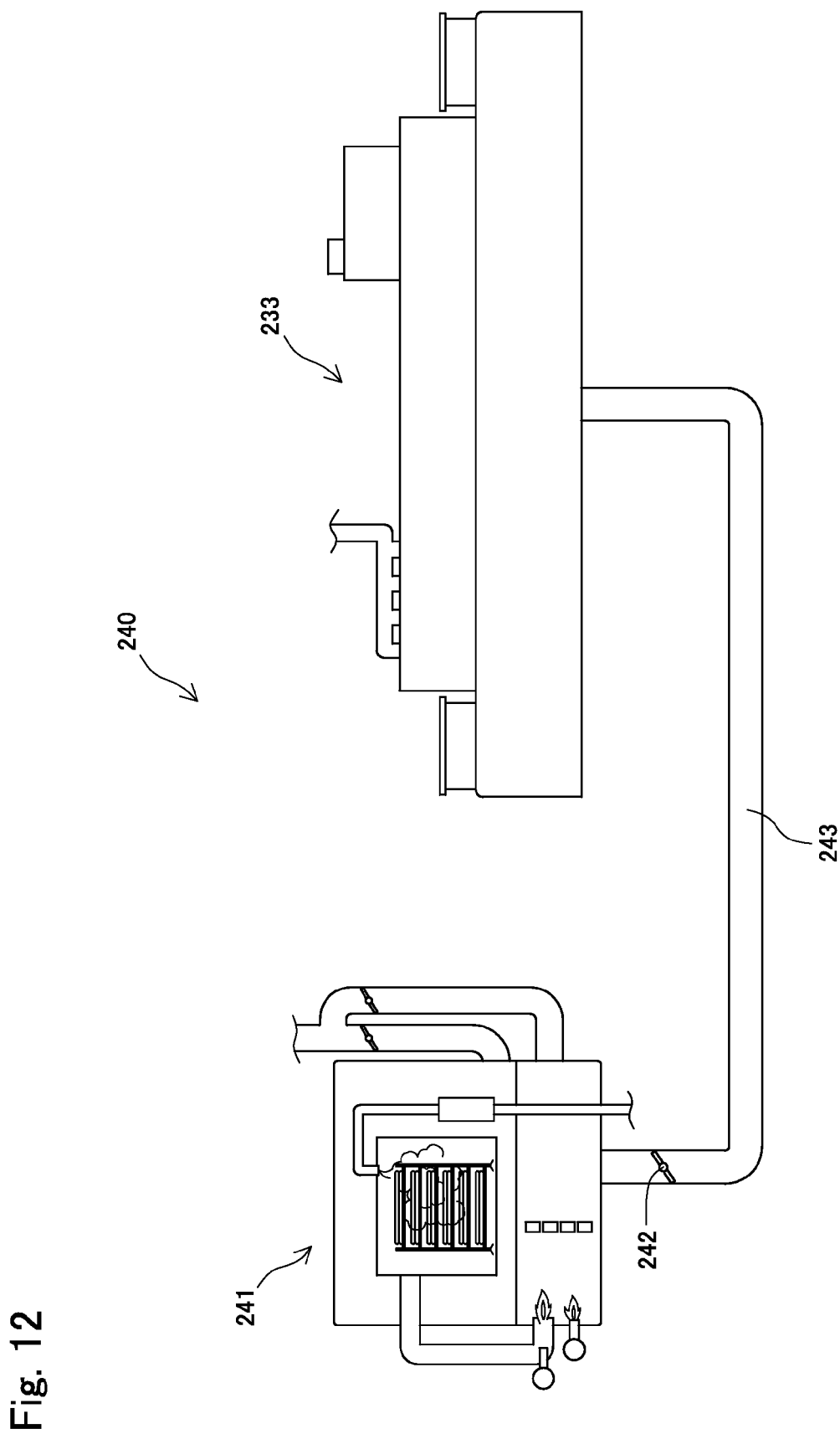
FIG. 12 is a schematic construction diagram showing a state of connecting a combustion chamber of one dry distillation-carbonization furnace of Example 5 of the present invention to a continuous furnace with a heat resistant route.

FIG. 12 schematically shows a construction of the manufacturing device 240 of the present example. In the device 240 for manufacturing recycled carbon fibers of the present example, one dry distillation-carbonization furnace 241 is communicated with the heating zone HZ in the continuous furnace 233 through a heat resistant route 243 having a damper 242. Other constructions are the same as Example 4.

As described above, the present invention was explained with reference to preferable embodiments, however, the present invention is not limited only thereto, and various modifications and changes of designs are possible within the range without departing from the gist of the invention as described below.

In the manufacturing method 1 of the present embodiment, a device using the mesh transportation part 6 having the mesh belt 4 was shown as a device for transporting CFRP 25 after dry distillation to the regeneration space 2, but is not limited thereto, and devices using other roller hearth kilns, and the like may be used. However, as the present embodiment, when the heat generator 21 is arranged in the lower part of CFRP 25 after dry distillation to be heated, use of the mesh belt 4 makes it possible to have preferable heat propagation and carry out effective heating.

Furthermore, Example 3 described the case in which two dry distillation-carbonization furnaces 201a and 201b supply overheated steam to each other, but it is possible to use three or more dry distillation-carbonization furnaces and install a pipe so that one dry distillation-carbonization furnace supplies overheated steam to the other two furnaces.

EXPLANATION OF SYMBOLS

1 Manufacturing method (method for manufacturing recycled carbon fibers)
2 Regeneration space
3 Main body of continuous furnace
7 Heat removal part
8 Recycled carbon fiber
9 Cooling part
16 Introduction inlet
17 Vent
25 Carbon fiber attached with fixed carbon on the surface (CFRP after dry distillation)
26 Continuous furnace
40 CFRP (carbon fiber reinforced plastic)
CZ Cooling zone
HZ Heating zone
100, 200 Devices for manufacturing recycled carbon fiber
101, 201 Dry distillation-carbonization furnace
102 Dry distillation-carbonization chamber (carbonization box)
103, 203 Combustion chamber
104 Burner
105, 205 Main body
107 Gas combustion pipe
110 Heat resistant tray
111 Heat resistant shelf
115, 215 Heating chamber
141, 142, 143, 144 Temperature measurement sensor

The invention claimed is:

1. A device for manufacturing recycled carbon fibers using carbon fiber reinforced plastic containing carbon fibers and a matrix component as a source material, comprising:
   a dry distillation-carbonization furnace that dry distils the carbon fiber reinforced plastic and converts a portion of the matrix component into fixed carbon to attach the fixed carbon to the surfaces of the carbon fibers, and is provided with a box-shaped main body, a dry distillation-carbonization chamber which is arranged in the inside of the main body and accommodates the carbon fiber reinforced plastic, a combustion chamber which is arranged in the lower part of the dry distillation-carbonization chamber and equipped with a burner, and a heating chamber formed in the space between the main body and the dry distillation-carbonization chamber; and
   a continuous furnace that continuously heats the carbon fibers attached with the fixed carbon and removes a portion of the fixed carbon, and is provided with a mesh transportation part which transports the carbon fibers attached with the fixed carbon and an elongated tunnel-shaped heat treatment space,
   wherein a steam generator is provided to the dry distillation-carbonization furnace and steam at 100° C. or higher and 700° C. or lower is supplied to the dry distillation-carbonization chamber.

2. The device for manufacturing recycled carbon fibers according to claim 1, wherein the steam generator supplies overheated steam at 500° C. or higher and 700° C. or lower to the dry distillation-carbonization chamber.

3. The device for manufacturing recycled carbon fibers according to claim 2, comprising:
   a plurality of the dry distillation-carbonization furnaces;
   a branch pipe which supplies overheated steam from a steam generator of a first dry distillation-carbonization furnace to a dry distillation-carbonization chamber of a second dry distillation-carbonization furnace; and
   a branch pipe which supplies overheated steam from a steam generator of the second dry distillation-carbonization furnace to a dry distillation-carbonization chamber of the first dry distillation-carbonization furnace,
   wherein overheated steam generated in one dry distillation-carbonization furnace is supplied as a heat source to heat the dry distillation-carbonization chamber of the other dry distillation-carbonization furnace.

4. The device for manufacturing recycled carbon fibers according to claim 1, wherein the combustion chamber in the dry distillation-carbonization furnace and the regeneration space in the continuous furnace are connected through a heat resistant route, and
   exhaust heat from the dry distillation-carbonization furnace is supplied as a heat source of the continuous furnace.

5. A method for manufacturing recycled carbon fibers using carbon fiber reinforced plastic containing carbon fibers and a matrix component comprising:
   a dry distillation step of dry distilling the carbon fiber reinforced plastic while supplying steam at 100° C. or higher and 700° C. or lower by a dry distillation-carbonization furnace and converting a portion of the matrix component into fixed carbon to attach to the surfaces of the carbon fibers; and
   a heat removal step of heating the carbon fibers attached with the fixed carbon by a continuous furnace having an elongated tunnel-shaped regeneration space constructed in the inside with a fire resistant material and removing a portion of the fixed carbon to obtain recycled carbon fibers.

\* \* \* \* \*